United States Patent [19]

Constant

[11] Patent Number: 4,820,006
[45] Date of Patent: Apr. 11, 1989

[54] HOLOGRAPHIC IDENTIFICATION SYSTEM USING INCOHERENT LIGHT

[76] Inventor: James N. Constant, 1603 Danbury Dr., Claremont, Calif. 91711

[21] Appl. No.: 493,041

[22] Filed: May 12, 1983

Related U.S. Application Data

[63] Continuation-in-part of Ser. No. 850,361, Nov. 10, 1977, abandoned, which is a continuation-in-part of Ser. No. 614,236, Sep. 17, 1975, abandoned.

[51] Int. Cl.⁴ ............................................. G03H 1/22
[52] U.S. Cl. .................................... 350/3.85; 350/374
[58] Field of Search .................. 350/3.67, 3.83, 3.85, 350/162.13, 374

[56] References Cited

U.S. PATENT DOCUMENTS 3,532,406 10/1970 Hartman ........................... 350/3.85

Primary Examiner—Bruce Y. Arnold
Attorney, Agent, or Firm—Harris, Kern, Wallen & Tinsley

[57] ABSTRACT

Apparatus and method for a holographic identification system used to determine the presence and identification of objects with tags and labels placed on persons, articles, goods, merchandise, documents, credit cards, identification cards and the like. The apparatus comprises holographic means for encoding and decoding tags and labels with ordinary incoherent light. The method comprises the steps of holographically encoding tags and labels, attaching labels to objects, and holographically decoding tags and labels wherein the encoding and decoding is done with incoherent light.

20 Claims, 1 Drawing Sheet

HOLOGRAPHIC IDENTIFICATION SYSTEM USING INCOHERENT LIGHT

CROSS-REFERENCE TO RELATED APPLICATION

This application is a continuation-in-part of copending application Ser. No. 850,361, (now abandoned) filed Nov. 10, 1977, which was a continuation-in-part of copending application Ser. No. 614,236, (now abandoned) filed Sept. 17, 1975.

BACKGROUND OF THE INVENTION

The present invention relates in general to presence detectors using tags and to identification systems using labels and more particularly to such systems where tags and labels are recorded and/or decoded holographically in real time. The system of the invention is characterized by its use of ordinary incoherent light to encode and decode labels and thusly resulting in the reduction of the complexity and costs of labeling systems.

Non-holographic non-laser prior art scanning systems have been used to identify objects, for example as shown in U.S. Pat. No. 3,225,177 "Mark Sensing" issued Dec. 21, 1965 to F. Stites and U.S. Pat. No. 3,744,026 "Optical Label Scanning" issued July 3, 1973 to G. Wolff. These patents describe a coded label as a vertical array of substantially parallel, horizontally oriented strips of various widths arranged in accordance with a preestablished code. An incoherent light beam is used to scan strips for providing amplitude and pulse-width modulated waveforms which can be detected and decoded to provide the information of each label. While these systems have performed well they do have a number of disadvantages. They are constrained by Rayleigh optics which limits the amount of coding which can be provided in a label of given size. They are also limited by the scanning rate of the light beam scanning the strips in the label, by the speed of movement of the label in the direction of travel of the object, and by the reflectivity and contrast of labels which, once encoded, cannot be altered. Their signal-to-noise ratio is relatively low and they have no processing gain. Moreover, they must use intense light beams and the decoding of labels is a relatively complex and costly operation. The non-holographic non-laser prior art scanning systems have been used in vehicular and railroad label reading applications.

Non-holographic laser prior art scanning systems have also been used to identify objects, for example as shown in U.S. Pat. 3,889,102 "Off-Axis Circular Coordinate Optical Scanning Device and Code Recognition System" issued June 10, 1975 to J. Dalquist and in the paper by E. Ulmer "Automatic Data Capture of Point-of-Sale Systems" appearing in Session 8 of the IEEE International Convention and Exposition Proceedings, Mar. 26-29, 1974. Although these systems use the laser replacing the non-laser as an illumination source, they do not take advantage of its coherent feature and, as a consequence, suffer the same limitation as do the non-laser systems.

The use of the laser in non-holographic label reading applications has not been without its problems. Lasers are complex devices for many practical applications outside the laboratory. Apart from their being constrained to a limited depth of focus and field of view they must be restricted as radiation hazards. Thus, only low powered lasers may be utilized and these produce weak signals. Their associated photodetectors are subject to photon noise from nearby lights and their use provides no processing gain since the detected signals from individual strips or bars in a label are essentially the detection of unmodulated signals in noise and which, therefore, must compete with the high reflectivity and clutter of the label background. As a result of the low signal-to-background clutter and noise they must compensate by having sophisticated receivers and signal decoders.

It is also possible to encode and decode identification labels holographically, for example as shown in U.S. Pat. No. 3,552,853 "Holographic Identification System" issued Jan. 5, 1971 to H. Saders et al., and in U.S. Pat. No. 3,894,756 "Identification Card Having a Reference Beam Coded Hologram" issued July 15, 1975 to J. Ward. These patents describe the coded label as a hologram. A laser is used to both encode and decode labels. Alternative to the laser, a pinhole, color filter and polarizer can be placed in front of an ordinary incoherent source to obtain coherent energy. In what follows, th combination of a pinhole, color filter and polarizer with an incoherent source to produce coherent light, while inefficient of its use of energy, will be considered to be the equivalent of a laser and both therefore should be distinguished from an incoherent source which illuminates labels directly.

The terms coherent and incoherent are used herein to describe the temporal and spatial characteristics of light. There are two types of coherence, temporal and spatial coherence, and light is said to be coherent when it possesses both types and is said to be incoherent when it lacks both types. Temporally coherent light is light that is monochromatic, i.e., it has only one wavelength. Spatially coherent light is light that is derived from a point source or is capable of being focused to a point. Today the laser is the usual source of coherent light although coherent light can also be obtained from incoherent sources as it was done routinely before the laser was invented. Spatial coherence can be achieved, for example, by placing a pinhole in front of an incoherent source so the light comes from a point. Temporal coherence can be achieved by placing a color filter in front of the incoherent source so that only a narrow band of the light is transmitted. Additionally, polarized light can be achieved by using a polarizer. Each process however involves throwing away by far the greater part of the light and therefore an extremely intense source of incoherent light is needed to generate a very small amount of coherent light. The use of a combination of an incoherent source with pinholes, color filters and polarizers is shown in the systems of H. Sanders and J. Ward. It is a purpose of the invention to replace coherent sources, including lasers and equivalent combinations of incoherent sources with pinholes, color filters and polarizers, by incoherent ones in holographic labeling systems.

While suggestive of the use of a new and potentially powerful technique of using holography in labeling systems, the prior art holographic labeling systems with lasers suffer the same restrictions as do the non-holographic laser labeling systems. And, the effort by the prior art to overcome the problems associated with lasers through the replacement of the laser by the combination of an incoherent light source with a pinhole, color filter and polarizer is an obvious waste of illumination energy.

From the above discussion it is clear that there are two basic approaches to labeling systems used for the identification of objects; non-holographic and holographic encoding and decoding systems. While both coherent and incoherent sources have been utilized by the prior labeling art in non-holographic encoding and decoding systems (mechanical scanning of conventional labels), the prior labeling art restricts holographic encoding and decoding of labels exclusively to coherent sources including lasers and equivalent combinations of incoherent sources with pinholes, color filters and polarizers It is a purpose of the present invention to provide holographic labeling systems using other than coherent sources.

In the present holographic art there are three types of holograms which can be recorded and reconstructed with incoherent light rather than requiring monochromatic or even coherent light. These are volume holograms and thin amplitude and phase holograms which can be recorded and reconstructed in a manner in which substantially all of the available energy is utilized and contributes to the image resolution and brightness of the holographic reconstructed image. Unlike the hologram art, the labeling art lacks the capability to encode and decode labels with incoherent light so that most of the available energy is utilized. The present labeling art is confined to the use of coherent light or its equivalent combination of incoherent light with a pinhole and color filter in which latter use a substantial portion of the incoherent light available is not used.

The present invention is directed to apparatus and method which makes it possible to encode and decode volume and surface type labels, which may be redundant or non-redundant holograms, with incoherent light in a manner in which substantially all of the available light is used and contributes to the resolution and brightness of the decoded images of labels. Briefly, this is done by applying the well known teachings of the holographic art for using incoherent light to the labeling art.

There are many advantages in being able to provide labeling systems using holography. First, the high information capacity of holographic labels can be used to substantially increase the signal-to-noise ratio of detected signals and for encoding multiple depths of focus, aspects and orientations of labels to increase the range and field of view. Second, labels are unobservable and illegible and can be further coded to provide additional security of access. Third, transitory as well as permanent labels may be provided. Fourth, encoders and decoders spatially expand their energy and cannot be limited as radiation hazards as do spot beam lasers and therefore need not be restricted to low power operation with consequent low signal-to-noise ratios for decoding signals and the need for sophisticated receivers and signal decoders. Fifth, associated photo detectors are least subject to photon noise from nearby lights and thereby further relaxing signal decoding requirements. Sixth, magnification can be obtained by several means, for example by using a lower wavelength to decode labels than the wavelength used for encoding. Seventh, amplification can also be obtained by several means, for example by using a relatively high intensity reference and/or read beam of wave energy, while using a relatively low intensity signal beam so that the image of the label appears brighter than the actual illumination with the relatively low intensity wave energy. Finally, by utilizing different wave lengths to encode and decode labels, either up-conversion or down-conversion can be obtained, thereby permitting encoding labels at acoustic, microwave, and infra-red frequencies and decoding labels in visible light. These and others are some of the advantages of implementing labeling systems using holography.

There are also many advantages in being able to provide holographic labeling systems without coherent light sources. First, the use of incoherent light increases the image brightness compared to the use of a coherent source. Second, the use of incoherent light in the invention does not throw away energy compared to use of same in the prior art, thereby permitting the full use of all energy from the incoherent light source. Third, the relaxed coherency requirement using incoherent source illumination means the label can be moved while it is being decoded thereby expanding the flexibility of operating labeling systems. Finally, fourth, incoherent sources are less complex and have lower costs compared to lasers, thereby permitting more practical and universal applications. These and others are some of the advantages of implementing labeling systems with incoherent light sources.

In the foregoing the term holographic labeling system has been used to denote the holographic encoding and decoding of labels Clearly, while labels can be encoded with information for identifying objects individually they can be equally encoded for determining the presence of objects, for example by encoding the same information on all labels for producing a holographic tagging system, i.e., a system which detects the presence of objects which have tags. It should be understood therefore that tagging systems are but variants of identification systems.

Accordingly, it is an object of this invention to provide improved holographic tagging and labeling systems.

It is a more specific object of the invention to provide holographic tagging and labeling systems which drastically reduce the coherence requirement for encoding and decoding labels.

It is another object of the invention to provide holographic tagging and labeling systems which utilize substantially all the energy of sources used to encode and decode labels.

It is another object of the invention to provide holographic tagging and labeling systems which drastically increase the signal-to-noise ratio o f signals.

It is another object of the invention to provide holographic tagging and labeling systems which drastically reduce the complexity and cost of encoding and decoding labels.

It is another object of the invention to provide in conjunction with one or more of the foregoing objects tagging and labeling system having a relaxed field of view requirement for encoding and decoding labels, a relaxed orientation requirement for encoding and decoding labels, unobservable and illegible labels, permanent and transitory labels, reduced radiation hazard requirements for encoding and decoding labels, reduced effects of photon noise in receivers, relaxed motion requirements for encoding and decoding labels, and the ready magnification, amplification and frequency shifting of signals.

SUMMARY OF THE INVENTION

According to the invention, the label comprises a holographic storage medium which can be either permanent or transitory. Preferably the label can be encoded by using signal and reference beams in the manner of conventional holography. Preferably the signal beam encodes information from a composer onto the label. Preferably the label can be decoded by using a read beam in the manner of conventional holography. Preferably the encoding and decoding of labels is carried out using incoherent sources of illumination. The encoded labels are attached to objects which can then be detected and identified by decoding the information from labels as objects pass through a read beam.

In accordance with a principle of this invention an apparatus for holographically encoding and decoding labels in a labeling system is provided. The apparatus comprises a holographic system for encoding labels and a holographic system for decoding labels. Preferably at least one of said holographic systems for encoding and decoding labels utilizes an incoherent light source.

In accordance with a further principle of this invention, a method for holographically encoding and decoding labels in a labeling system is provided. The method comprises the steps of holographically encoding labels, attaching labels to objects, and holographically decoding labels. At least one of said steps of encoding and decoding labels utilizes an incoherent light source.

It will be appreciated from the foregoing description that the invention provides an apparatus and method for holographically encoding and decoding labels in a labeling system. The apparatus comprises holographic means for encoding and decoding labels using incoherent light sources. The method is equally uncomplicated and comprises the steps of holographically encoding a label, attaching labels to objects, and holographically decoding labels. At least one of the encoding and decoding of labels is done using an incoherent light source.

BRIEF DESCRIPTION OF THE DRAWINGS

The foregoing objects and many of the attendant advantages of this invention will become more fully appreciated as the same is better understood by reference to the following detailed description when taken in conjunction with the accompanying drawings wherein.

DETAILED DESCRIPTION OF THE PREFERRED EMBODIMENTS

Figure 1:
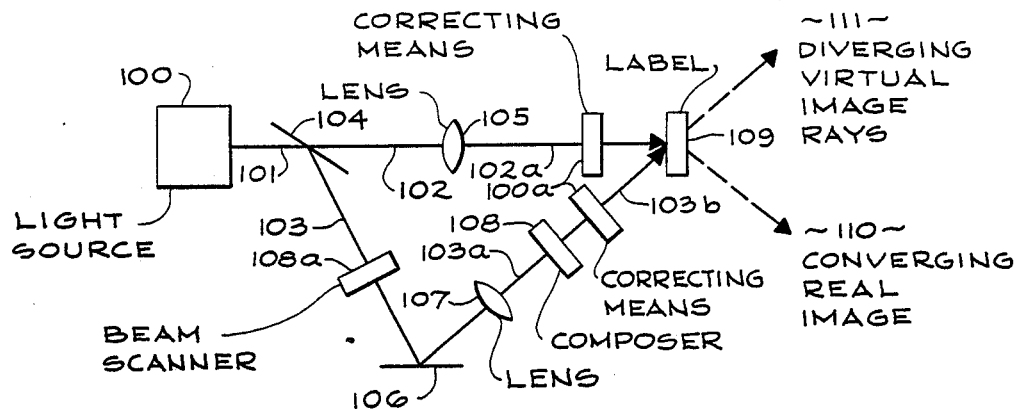
FIG. 1 is a block diagram of a holographic system used for encoding a label and incorporating a presently preferred embodiment of the invention.

There are two basic approaches to labeling systems; non-holographic and holographic encoding and decoding. There is a unique advantage to be gained by making full use of the coherent properties of electromagnetic beams using the holographic approach which is not possible in non-holographic (usually done bit-by-bit) encoding and decoding systems. The basic components of a holographic storage system are well known. In general, a laser beam is split into signal and reference beams. The signal beam passes through a data input device called an encoder, or alternatively a spatial filter or composer, and then combines with the reference beam to form an interference pattern on the label which is then recorded, i.e., the composer contains the information being encoded in the label. During the readout operation, the signal beam is removed and the recorded pattern acts like a diffraction grating for the read beam, which may be the reference beam or some other beam, and projects the reconstructed image at the detector. The detector may be any one of a single, linear or planar array of detectors with as many elements as there are bits in each record. Therefore, during readout, the entire page of data from the composer previously encoded in the label is available for electronic processing or viewing. Clearly, the system capacity and speed of a holographic system exceed the capacity and speed of a non-holographic bit system. In general, the holographic labeling systems of the prior art and invention are arranged to provide coincidence of the signal and reference beams at the label. Also, the reference and signal beams may be scanned to provide addressing of locations in the composer and in the label. Thus, the holographic encoding and decoding of labels in a labeling system presents many advantages, notably the high storage density and low access time of information in the label, not attainable by the non-holographic bit-by-bit scanning encoding and decoding techniques. Lasers, lens systems, electronic controls, composers, holographic storage media suitable for labels, and detectors which can be utilized for making holographic encoding and decoding systems including the invention are well known, shown for example in the Sanders and Ward systems, and have been summarized in the article by D. Chen and J. Zook "An Overview of Optical Data Storage Technology" appearing in the August, 1975 issue of Proceedings of the IEEE.

Other examples of holographic apparatus and methods of encoding and decoding labels which may be utilized are shown in U.S. Pat. No. 3,773,400 "Process for Fixing Holographic Patterns in Electro-Optic Crystals" issued Nov. 20, 1973 to J. Amodei and D. Staebler, U.S. Pat. No. 3,770,886 "One Dimensional Holographic Recording of Electrical Signals" issued Nov. 6, 1973 to H. Kiemle, U.S. Pat. No. 3,754,808 "Holographic Readout System" issued Aug. 28, 1973 to B. Clay and A. Gore, U.S. Pat. No. 3,767,285 "Enhanced Readout of Stored Holograms" issued Oct. 23, 1973 to R. Mezrich, U.S. Pat. No. 3,936,140 "Arrangement for Sequential Data Storage" issued Feb. 3, 1976 to H. Ruell, U.S. Pat. No. 3,764,979 "Holographic System for Subject Recognition" issued Oct. 9, 1973 to D. Gabor, U.S. Pat. No. 3,628,847 "Hologram Memory" issued Dec. 21, 1971 to D. Bostwick, U.S. Pat. No. 3,706,495 "Method of Measuring the Velocity of a Small Moving Object" issued Dec. 19, 1972 to W. Dotson Jr., and U.S. Pat. No. 3,542,452 "Transitory Hologram Apparatus" issued Nov. 24, 1970 to H. Gerritsen and H. Sommers. General references for making and using holograms which also may be utilized when implementing the present invention may be found in the books by M. Beesly "Lasers and their Applications" Halsted Press, 1976 (chapter on Holography), and H. Smith "Principles of Holography" Wiley-Interscience 1969.

In order to practice the present invention, a label is encoded following the hologram art, for example by recording in a photographic emulsion a wavefront interference beam of either coherent or incoherent light with like light scattered by the data which is to be encoded being in the form of a predetermined set of information of any nature whatsoever, in a two-dimensional form as well as in a three-dimensional form. The information data may relate to merchandise identification, model number, stock number, origin, date of manufacture, pricing, sales control, theft control, credit data, personal identification data and the like. Information may be recorded in the label by making successive or consecutive exposures of the photographic film or plate, for example by changing one or more of the wavelength, angle of incidence, and angle of polarization of the reference beam from one exposure to the next. In this manner, the label is recorded with a considerable amount of information, of several orders of magnitude greater than any amount of information capable of being recorded non-holographically. Thus, it is possible to provide encoded labels which can be decoded over wide depths of focus, fields of view, aspect and rotational orientations.

Referring to FIG. 1, there is shown a source of light 100. Light beam 101 emitted by light source 100 is divided into reference beam 102 and signal beam 103 by partially reflecting mirror 104. Reference beam 102 is widened into reference beam 102a by lens system 105. Typically the lens system may be an expander-collimator lens system or a negative lens; a negative lens is illustrated. Signal beam 103, after reflection from totally reflecting mirror 106, is also widened into signal beam 103a by lens system 107. Composer 108 in the path of widened signal beam 103a is illuminated thereby to produce widened signal beam 103b which may consist of light scattered, reflected or transmitted by composer 108. In the path of reference beam 102a is a holographic storage means forming label 109. At least a portion of signal beam 103b also impinges upon label 109. As shown in FIG. 1 reference beam 102a and signal beam 103b arrive at the respective points of label 109 at different angles with respect to each other. A beam scanner 108a may be used in the path of signal beam 103 to provide addressing of locations in the composer 108 and in label 109. While shown in the signal path 103, beam scanner 108a may be equally placed elsewhere, for example in path 101 as shown in the reference by D. Bostwick. In the prior labeling art, light source 100 is a coherent source of light of a predetermined frequency, for example a laser or its equivalent combination of an incoherent source with a pinhole, color filter and polarizer, while in the present invention light source 100 may be a coherent source (laser) or incoherent source (sunlight, white light, mercury arc, light bulb, light lamp, light-emitting diode, etc.). When light source 100 is specified to be an incoherent source the making of label 109 may require the use of a correcting means 100a in the path of light beam 101 to avoid blurring of label 109. Correcting means 100a may be in the form of a diffraction grating and/or Fersnel zone plate and may be inserted between light source 100 and label 109. A correcting means 100a is shown in FIG. 1, in the reference and signal paths.

The intensity of light impinging on each part to label 109 depends upon the respective amplitudes and relative phases of the waves arriving at each point from the reference beam 102a and from signal beam 103b. Thus, the intensity of light will vary from point-to-point to produce an interference pattern which is modulated in accordance with the information in composer 108 forming signal beam 103b. This interference pattern will become manifest at the surface of or within label 109 causing diffraction of the light scattered, reflected or transmitted and resulting in the occurrence of two sets of diffracted waves 110 and 111, respectively. As shown in FIG. 1, set 110 of diffracted waves converges forming a real image which appears at a position conjugate to the position of composer 108. Also, as shown, set 111 of diffracted waves diverges to form rays of a virtual image which is co-incident in position with composer 108. Thus, while set 110 of diffracted waves converges, set 111 of diffracted waves diverges. Images 110 and 111 are permanent when label 109 is specified as a permanent label but these will change in time when label 109 is specified as a transitory label. Clearly, the system of the invention may operate in one of two modes as desired; first, by permanently encoding label 109 and then decoding a two step process (encode then decode) and, second, alterably encoding label 109 and then decoding in a one step process (decode while encode).

The apparatus of FIG. 1 is identical to the apparatus for recording a hologram using either a coherent or incoherent light source 100. Thus, well known teachings of the hologram art are used by the invention for encoding labels and, when specifying light source 100 as an incoherent source, to distinguish the prior labeling art; the difference being that while the prior labeling art encoding apparatus utilizes a coherent source 100 or equivalent, the invention uses the combination of an incoherent source 100 possibly with a correcting means 100a.

Once encoded, for example using the apparatus of FIG. 1, label 109 can be attached to an object. Thus, a plurality of objects with a label 109 for determining the presence of or for uniquely identifying each object 112 can be provided.

Figure 2:
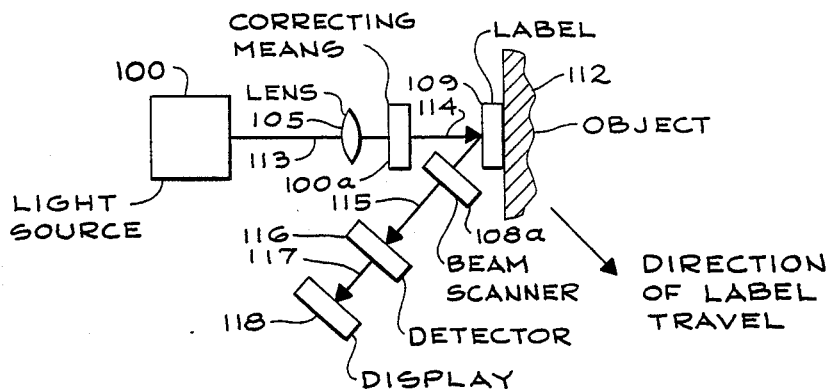
FIG. 2 is a block diagram of a holographic system used for decoding a label and incorporating a presently preferred embodiment of the invention.

Referring to FIG. 2, label may be decoded by illuminating label 109 by a read beam 113 emitted by light source 100. Light beam 113 is widened into read beam 114 by lens system 105. Reflected beam 115 carries the information from label 109 to a detector 116 preferably in the form of an image detector. It should be understood that a beam scanner 108a may be used to scan read beam 115. It will be appreciated that what is seen by an eye placed at the detector 116 location is the image of composer 108. Thus, detector 116 in the form of an image detector forms the image of composer 108 at its output 117 which can then be recorded or viewed in a suitable display 118. Composers 108 and image detectors 116 which may be utilized are well known in the holographic art, for example as shown in the reference by D. Chen and J. Zook and in references therein. In the prior labeling art light source 100 is a laser or its equivalent combination of an incoherent source with a pinhole, color filter and polarizer while in the present invention light source 100 may be a laser or incoherent source (sunlight, white light, mercury arc, light bulb, light-emitting diode, etc.). When light source 100 is specified to be an incoherent source the reading of label 109 may require the use of a correcting means 100a in the path of light beam 113 to avoid blurring of the image at detector 116. Correcting means 100a may be in the form of a diffraction grating and/or Fresnel zone plate and may be inserted between light source 100 and label 109. A correcting means 100a is shown in FIG. 2 in the path of read beam 114.

When label 109 is specified as a permanent label the encoding operation of FIG. 1 proceeds prior in time to the decoding operation of FIG. 2, i.e., once labels have been encoded and attached to objects all that is needed to decode labels is the simple apparatus of FIG. 2. Otherwise, when label 109 is specified as a transitory label, the encoding operation of FIG. 1 proceeds at the same time as does the decoding operation of FIG. 2, i.e., the apparatus needed for encoding and decoding is the simultaneous combination of the systems of FIGS. 1 and 2.

The apparatus of FIG. 2 is identical to the apparatus for reconstructing a hologram using either coherent or incoherent light source 100. For example, the reference by B. Clay shows apparatus for reconstructing a hologram using an incoherent light source 100. Thus, well known teachings of the hologram art are used by the invention for decoding labels and, when specifying light source 100 as an incoherent source, to distinguish the prior labeling art; the difference being that while the prior labeling art decoding apparatus utilizes a coherent source 100, the invention uses an incoherent source possibly with a correcting means 100a.

From the foregoing it will be appreciated that the invention discloses a holographic identification system which uses incoherent light means 100 made possible by using a correcting means 100a for correcting the lateral and longitudinal dispersions which otherwise, i.e., not having correcting means 100a, would blur holographic recordings in label 109 and reconstructed images in detector 116. A diffraction grating may be used to correct for the lateral dispersion and a Fresnel zone plate may be used to correct for the longitudinal dispersion. However, the Fresnel zone plate has an important limitation, the longitudinal dispersion is corrected only for a single image point, namely that part whose hologram component is aligned with the compensating Fresnel zone plate. This limitation may become inconvenient in applications in which it is desired to view the entire image of label 109, not just a small region of it. However in many labeling applications this limitation will present no great problem if one encodes and decodes the image of label 109 a point at a time, i.e., by either scanning label 109 with a beam scanner 108a or while moving label 109 through the apertures of reference beam 102a and read beam 114, thereby bringing each part of the image of label 109 into position for dispersion correction. Thus, there are two basic holographic approaches for encoding and decoding labels 109 namely wherein the image of label 109 is detected in detector 116 as a whole (in parallel) or in part (in series). The latter approach is comparable to that for the non-holographic bit-by-bit approach, for example the scanning beam systems of F. Stites and G. Wolff. It becomes therefore possible to implement the system of the invention as either a parallel or serial identification system, i.e., wherein labels 109 are decoded in whole or on a bit-by-bit basis and for which labels 109 must be suitable accordingly.

In many labeling applications it is required that labels 109 must be rotationally aligned relative to read beam 114. This is due to the fact that, in such applications, information in composer 108 is preferentially aligned, for example the symbol 1 in composer 108 is encoded in label 109 a manner which can be decoded in detector 116 only if label 109 is properly aligned. This problem however can be easily resolved as previously suggested by encoding a plurality of aspects and orientations in label 109 or by specifying information in composer 108 which is not preferentially aligned, for example the symbol 0 in composer 108 is encoded in label 109 in a manner which can be decoded in detector 116 regardless of the alignment of label 109. Thus, it becomes possible to specify the encoding of label 109 so that its subsequent decoding is independent of its rotational alignment relative to read beam 114. A label comprising concentric circles that may be accurately recovered from scanning in any direction is shown in the reference by G. Wolff.

In general, it should be understood that any of the well known teachings of holography may be applied also to the system of the invention including the use of diffusers to obtain redundant holograms in labels 109, the magnification of images by using a reconstructing wavefront having a different radius of curvature from that of the reference wavefront, by changing the size of the hologram in label 109 and by using different wavelengths for the reference, signal and read beams, the use of Fresnel and Fourier holography, the elimination of third order aberrations, etc., to implement the invention. These teachings are well known and therefore a description of these need not be given here. For example, label 109 may be composed of any material known in the hologram art for recording permanent or transitory labels 109 including labels shown in the references by H. Sanders, J. Ward, D. Bostwick and H. Gerritsen. The making and operating of storage memories may be found in the references by D. Chen and J. Zook, H. Ruell, J. Amodei and D. Staebler, H. Kiemle, R. Mezrich, D. Gabor B. Clay and A. Gore, D. Bostwick and M Beesly. Thus label 109 may be specified having a suitable memory means and also having a suitable extent for permitting parallel or serial encoding and decoding. Preferably the label material contrasts with the background material of the object to which the label is attached so that light incident upon the label during decoding is reflected with different intensity from the label and from the object.

It will be appreciated by those skilled in the holographic labeling art that the basis of the present invention for a holographic labeling system rests upon the teaching of the hologram art wherein a number of ways are known for making and/or viewing holograms with ordinary incoherent light and thereby making it unnecessary to rely on the coherent light of the laser or even the quasi-coherent light of a mercury arc lamp. This can all be seen in a number of publications including the article by E. Leith and J. Upatnieks "Photography by Laser" appearing in the June 1965 issue of Scientific American, the article by K. Pennington "Advances in Holography" appearing in the Feb. 1968 issue of Scientific American, in the book "Lasers and Light: Readings from Scientific American" W. H Freeman and Co. 1969, and in the book by A. Klein "Holography: With an Introduction to the Optics of Diffraction, Interference, and Phase Differences" J. B. Lippincott Co. 1970. More specifically, holography teaches that there are a number of techniques which obviate the strict coherency requirement of light source 100. For example, referring to FIG. 1, a diffraction grating 100a can be placed between light source 100 and label 109 to compensate for the lateral dispersion of images. And, a Fresnel zone plate 100a can be placed between light source 100 and label 109 to compensate for the longitudinal dispersion of images. In another example, referring to FIG. 2, when decoding label 109 a diffraction grating 100a can be placed between light source 100 and label 109 to compensate for the lateral dispersion of images which arises from the fact that label 109 (a hologram) acts as a diffraction grating and will disperse light 115 into its component colors. Also, a Fresnel zone plate 100a can be placed between light source 100 and label 109 to compensate for the longitudinal dispersion of images which arises from the fact that label 109 (a hologram) acts as a lens whose image distance is a function of wavelength and will disperse light 115 longitudinally into its component colors. Indeed, the combination of a diffraction grating and Fresnel zone plate 100a makes it possible to encode and decode label 109 in completely white light as is well known and appreciated in the hologram art.

Up to this point, the system of the invention has been described using incoherent light source 100 in combination with correcting means 100a. It should be understood, however, that the use of correcting means 100a is not required in other possible embodiments of the invention. For example, the Lippman process can be used to produce full-color images in label 109 or information in composer 108 and subsequently detecting images in detector 116, just as in a conventional photograph. In a second example, the Denisyuk method can be used to produce full-color images in label 109 and with the subsequent decoding of label 109 with a white light source of limited spatial extent such as a projector lamp or an ordinary incandescent bulb. Yet another technique which may be utilized is to encode label 109 using the Benton or rainbow method of holography which then permits the subsequent decoding of label 109 with a white light source. And, still other techniques are possible, for example encoding label 109 as a composite hologram from a composer 108 in the form of a plurality of pictures using conventional white light which when combined with the Benton method for holography label 109 can be detected with ordinary white light. Thus, it is possible to consider that correcting means 100a is not needed when implementing at least one of the Lippman process, the Denisyuk method the Benton method of encoding and decoding labels and thusly contrasting to the method shown by way of example, in FIGS. 1 and 2, wherein correcting means 100a is provided. In any case, the use of a correcting means 100a is for correcting the blurring of encoded and decoded information and its use is not needed when the encoding and decoding is inherently amenable with incoherent light. Three is yet another application in which correcting means 100a is not needed, namely when the blurring or spatial spreading of colors is used to decode label 109, i.e., when certain combinations of colors have been encoded into label 109 and are decoded as a function of wavelength made possible by the lateral and longitudinal dispersion of the different colors. This technique of course is wasteful of the illumination energy.

In summary, holography teaches that the making and viewing of holograms requires no laser at all and it is this teaching of holography which is utilized by the invention to implement a labeling system wherein at least one of the encoding and decoding of labels 109 may be accomplished using an incoherent light source. A summary of this important teaching of holography is provided in the article by E. Leith "White Light Holograms" appearing in the October, 1976 issue of Scientific American. The Leith article is a general reference for the theory and design of holograms using incoherent sources.

More specifically, the manner and technique of forming and reconstructing holographic images with incoherent light as taught in the Leith article includes the use of diffraction gratings and Fresnel zone plates for correcting laterally and longitudinally displaced images.

A hologram behaves like a parallel line diffraction grating, bending the light at an angle that is approximately proportional to the wavelength. Images formed at two different wavelengths are laterally displaced, with longer wavelength images having greater displacement. This type of imaging defect, called lateral dispersion, exists independently of the longitudinal dispersion described later.

Suppose, for example, that in the reconstruction process one places between the source and the hologram a diffraction grating with a spacing equal to the average spacing of the fringes of the hologram, and suppose further that for illuminating the hologram ones uses precisely that diffracted order which bends the light oppositely from the way the hologram does. The dispersions would then compensate. As viewed from the hologram, each wavelength component of the incident light would impinge from a slightly different direction, the angular displacement being just the right amount to cause the images formed by the various wavelengths to be exactly in register. If the adjustments are made properly, the coherence requirement can be reduced to exactly what it was in Gabor's method.

The same principal applies in making the hologram.

The hologram acts like a lens, causing a portion of the incident light to be converted into a diverging wave, which projects back to a virtual image whose resolution is ideally the same as that of the original object. The distance between the hologram and the image formed at each wavelength, however, is proportional to the wavelength; hence for white light, which consists of all the visible wavelengths, there is no plane where all the light is focused, and the resulting image is blurred, a defect known as longitudinal dispersion.

For example, in illuminating a Gabor hologram one could interpose a Fresnel-zone plate between the hologram and the illuminating source. One could then take the real image formed by the zone plate as a source for illuminating the hologram. (The zone plate forms a longitudinally dispersed image of the source, with the violet, the shortest wavelength, being the most distant from the plate.) Such an arrangement compensates for the longitudinal dispersion of the hologram, causing the image for each wavelength to form at the same distance from the hologram. It follows that such a hologram could be viewed in white light. A similar argument can be made for the hologram-forming process, which leads in turn to the suggestion that one might also be able to make holograms in completely white light. Indeed, if one were to use a zone plate and a grating in combination, one could simultaneously compensate for both lateral and longitudinal dispersion, thereby making it possible for high-quality, off-axis holograms to be both formed and viewed in completely white light.

Lateral dispersion is corrected by inserting an actual diffraction grating in the path of the incident light beam. The grating is carefully chosen to have a spacing equal to the average spacing of the fringes of the hologram. Hence, it can be used to bend the light oppositely from the way the hologram does, exactly compensating for the lateral dispersion caused by the hologram. As a result images formed at two different wavelengths are focused at the same point.

Longitudinal dispersion is corrected by inserting a Fresnel-zone plate in the path of the incident light beam. The device predisperses a beam of white light longitudinally, forming a slightly displaced virtual image for each wavelength, with the shorter wavelengths focusing farther from the zone plate. This collection of displaced images serves in turn as the light source for the hologram (in this case again a hologram of a single point). The hologram, which acts just like such a zone plate bends the longer-wavelength light more, bringing all colors to a common point. Combination of parallel-line diffraction grating and Fresnel-zone plate drastically reduces coherence requirement for making and viewing off-axis holograms.

As stated, the basis of the present invention for a holographic labeling system rests upon the teaching of the hologram art wherein a number of way are known for making and viewing holograms with ordinary incoherent light. For example, the Leith article just cited teaches the use of an incoherent light source used to record and reconstruct hologram with incoherent light. The present invention uses the incoherent light source 100 but replaces the Leith hologram by a hologram-label 109. As taught by Leith, a diffraction grating and-/or Fresnel zone plate correcting means 100a may be used to correct the lateral and longitudinal dispersions which appear when source 100 is incoherent. For recording labels, a correcting means 100a may be placed in path 102 between source 100 and label 109 and/or in path 103 between source 100 and label 109, as shown in FIG. 1. For viewing labels, a correcting means 100a may be placed in the path between source 100 and label 109, as shown in FIG. 2. Diffraction gratings and Fresnel zone plates are known optical elements and the construction and use of same will be obvious to those skilled in the art. In particular, the Leith teaching which describes the manner and techniques for using a correcting means 100a to correct the lateral and longitudinal dispersions is used in the system of the present invention.

The lateral displacement of images which would result when using incoherent light source 100 and a conventional hologram-label 109 is corrected by a diffraction grating correcting means 100a. Diffraction grating 100a a may be inserted in the path 103 between incoherent source 100 and label 109 or, alternatively, may be inserted in path 102 between incoherent source 100 and label 109. For example, a first diffraction grating 100a may be inserted between lens 105 and label 109 and a second diffraction grating 100a may be inserted between composer 108 and label 109, as shown in FIG. 1, or a single diffraction grating 100a is inserted between lens 105 and label 109, as shown in FIG. 2. It will be obvious to adjust each diffraction grating 100a prior to or during encoding and decoding of labels 109. In FIGS. 1 and 2, for example each diffraction grating 100a may be manually or automatically adjusted spatially and/or rotationally to insure the coincidence of images of objects being recorded in label 109 (a single point or more complex object). The diffraction grating is chosen to have a spacing equal to the average spacing of the fringes of the hologram label 109. The light falling on label 109 bends oppositely from the uncorrected case, i.e., without diffraction grating 100a, thereby exactly compensating for the lateral dispersion. The well known result is to form images at different wavelengths which focus at the same point, i.e., correcting for the lateral dispersion.

The longitudinal displacement of images which would result when using incoherent light source 100 is corrected by a Fresnel zone plate correcting means 100a. Fresnel zone plate 100a may be inserted in path 102 between incoherent source 100 and label 109 or, alternatively, may be inserted in path 103 between incoherent light source 100 and label 109. For example, a first zone plate 100a may be inserted between lens 105 and label 109 and a second zone plate 100a may be inserted between composer 108 and label 109, as shown in FIG. 1, or a single zone plate 100a may be inserted between lens 105 and label 109, as shown in FIG. 2. It will be obvious to adjust each zone plate 100a prior to or during encoding or decoding of labels 109. In FIGS. 1 and 2, for example each zone plate 100a may be manually or automatically adjusted spatially and/or rotationally to insure the coincidence of objects being recorded in label 109 (a single point or more complex object). Zone plate 100a predisperses a beam of white light 102, 103, 113 longitudinally, thereby forming a slightly displaced virtual image for each wavelength, with the shorter wavelengths focusing farther from the zone plate 100a. This collection of displaced images serves as the light source for label 109. The hologram label 109 also acts like a zone plate and bends the longer wavelength light more, therefore bringing all wavelengths to a common point, i.e., correcting for the longitudinal dispersion. It will also be obvious to combine a diffraction grating and Fresnel zone plate as correcting means 100a and thereby drastically reduce the coherence requirement for making and viewing off-axis hologram labels 109.

Also, as shown by the Leith article, the hologram art teaches the manner and technique of using emulsions as holograms (Lippmann process, Denisyuk method, etc.) or of using two-step holograms (Benton method) to enable the use of incoherent light, i.e., without a correcting means 100a, and these teachings are also used by the invention. In general, the invention system uses an incoherent light source 100 to illuminate labels 109 with incoherent light with or without a correcting means 100a. In other words, a correcting means 100a may be used to correct the lateral and/or longitudinal dispersions and/or an emulsion or two-step type label 109 may be used to achieve the focusing of images which would result otherwise when source 100 is incoherent.

The Lippmann process produces interference fringes in a thick photographic emulsion type label 109, in FIG. 1, by allowing the incident light to reflect back on itself, for example, with the aid of a pool of mercury on the back side of emulsion label 109. Silver deposits formed at the surfaces of maximum brightness are then fixed by developing label 109. In the readout process, in FIG. 2, the incident light is partially reflected at successive layers o silver grains in emulsion 109. The reflections reinforce one another at the wavelengths corresponding to the original light used to expose the emulsion label 109, forming a 3-dimensional image of object 108 in detector 116.

The Denisyuk method operate by passing a beam of coherent light from a coherent source 100, in FIG. 1, through a photographic emulsion type label 109 reflecting the light from an object 108 and recording the interference created in the emulsion 109 between the incident beam and reflected beam. In FIG. 2, hologram label 109 is viewed by directing white light 114 at the label 109, which selects by reinforcement light of only one wavelength, forming a 3-dimensional image of object 108 in detector 116.

The Benton method requires two steps. First, a master hologram label 109 is produced in the conventional way, i.e., using a coherent source 100. Next, a horizontal slit (not shown) is placed over label 109 to form an image used as the object for a second hologram label 109 in FIG. 1. In FIG. 2, when the second hologram label 109 is illuminated with a white light source 100, each wavelength forms a image of the slit at different vertical positions in each single color, i.e., each vertical position forms a 3-dimensional image of an object 108 in detector 116.

In general, the method of the invention comprises the steps of holographically encoding labels with information such as identification code, owner, type vehicle or product, book-keeping data such as location, date and time of manufacture, serial number, measurement data such as temperature and pressure, and so forth, and then attaching the labels to objects with a label for uniquely identifying each object or for determining its presence, providing the desired information, and then holographically decoding the labels to recover the coded information. More specifically, the method of the invention comprises the steps of holographically encoding labels, attaching labels to objects with a label for each object, and holographically decoding labels wherein at least one of said steps for encoding and decoding labels utilizes an incoherent light source. The method of the invention can include the additional step of providing a permanent or a transitory label.

From the foregoing it will be appreciated that the invention provides an uncomplicated apparatus for identifying objects using labels. The apparatus requires well known holographic recording, storage, and reading means which can be adapted for use in the particular application of the labeling system. The method is equally uncomplicated and requires a few steps for the holographic encoding of labels, their attachment to objects, and their holographic decoding. The system of the invention provides an unlimited amount of coding which can be provided in the label, fast access of labels, and unlimited speed of movement of labels. Moreover, encoding and decoding labels requires no laser at all and is done with simple and uncomplicated incoherent light sources being therefore a relatively easy and economic operation being essentially at the level of conventional photography. Because of its use of incoherent light, the invention provides a novel holographic labeling system over the prior art.

In many applications it is desired to determine the presence of objects. Such applications may include antishoplifting systems in which goods are tagged to implement theft control. These applications require labels 109 encoded not for object identification but for object presence. For example, labels 109 may be encoded as the hologram of the symbol of concentric circles mentioned previously so that it can be decoded from a number of possible orientations with identical labels 109 for each object since it is only the object's presence and not its identification which is desired.

It will be appreciated by those skilled in the art that various modifications can be made within the scope of the invention. That is, a variety of light sources, lens systems, composers, labels, and ancillary electronic controls can be used. And, encoding and decoding labels can be carried out in the acoustic, microwave, millimeter, and infra-red portions of the electromagnetic spectrum. Thus, a variety of holographic encoding and decoding means and label materials and compositions and geometries can be used to carry out the invention. Hence, the invention can be practiced otherwise than as specifically described herein.

Although only preferred embodiments of the present invention have been described in detail herein by way of example, it is not intended that the invention be restricted thereto, but that it can be limited by the true spirit and scope of the appended claims.

I claim:

1. In a labeling system for identifying objects using labels, the combination of:
   holographic means for encoding labels using incoherent light directly illuminating labels;
   a plurality of objects with a holographically encoded label for each object; and
   holographic means for decoding labels.

2. The system of claim 1 wherein said incoherent light is one of sunlight, white light, mercury arc light, incandescent light, light bulb, light projector lamp, and solid state emitting source.

3. The system of claim 1 wherein said holographic means for encoding and decoding operate at different portions of the electromagnetic spectrum.

4. The system of claim 1 wherein at least one of said holographic means utilizes a scanning means.

5. The system of claim 1 wherein said holographic means for encoding and decoding operate at the same time.

6. The system of claim 1 wherein said holographic means for encoding and decoding operate in time sequence.

7. The system of claim 1 wherein said encoded labels are non-erasable.

8. The system of claim 1 wherein said encoded labels are erasable.

9. The system of claim 1 wherein said labels are encoded each with the same information.

10. The system of claim 1 wherein said holographic means for decoding labels uses incoherent light directly illuminating labels.

11. A method for identifying objects using labels, including the steps of:
    holographically encoding labels using incoherent light directly illuminating labels;
    attaching encoded labels to a plurality of objects with an encoded label for each object; and
    holographically decoding labels.

12. The method of claim 11 utilizing one of sunlight, white light, mercury arc light, incandescent light, light bulb, light projector lamp and solid state emitting source as a source of said incoherent light.

13. The method of claim 11 including encoding and decoding at different portions of the electromagnetic spectrum.

14. The method of claim 11 including scanning the beam during at least one of encoding and decoding labels.

15. The method of claim 11 including encoding and decoding labels at the same time.

16. The method of claim 11 including encoding and decoding labels at different times.

17. The method of claim 11 including providing unerasable labels.

18. The method of claim 11 including providing erasable labels.

19. The method of claim 11 including providing each label with the same information.

20. The method of claim 11 including performing the step of holographically decoding labels using incoherent light directly illuminating labels.

* * * * *